United States Patent
Choi et al.

(10) Patent No.: US 9,030,751 B2
(45) Date of Patent: May 12, 2015

(54) FLUIDIC LENS

(75) Inventors: Seung-Tae Choi, Hwaseong-si (KR); Min-Seog Choi, Seoul (KR); Eun-Sung Lee, Hwaseong-si (KR); Kyu-Dong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1062 days.

(21) Appl. No.: 13/035,072

(22) Filed: Feb. 25, 2011

(65) Prior Publication Data

US 2012/0081795 A1  Apr. 5, 2012

(30) Foreign Application Priority Data

Oct. 5, 2010 (KR) ........................ 10-2010-0096874

(51) Int. Cl.
*G02B 3/14* (2006.01)
(52) U.S. Cl.
CPC ........................................ *G02B 3/14* (2013.01)
(58) Field of Classification Search
CPC .............. G02B 1/06; G02B 3/12; G02B 3/14; G02B 21/33
USPC .......................................... 359/665, 666, 667
See application file for complete search history.

(56) References Cited

U.S. PATENT DOCUMENTS

| | | | |
|---|---|---|---|
| 5,574,598 A | 11/1996 | Koumura et al. | |
| 6,188,526 B1 | 2/2001 | Sasaya et al. | |
| 7,068,439 B2 | 6/2006 | Esch et al. | |
| 7,256,943 B1 | 8/2007 | Kobrin et al. | |
| 7,359,124 B1 | 4/2008 | Fang et al. | |
| 7,369,321 B1 | 5/2008 | Ren et al. | |
| 7,440,193 B2 | 10/2008 | Gunasekaran et al. | |
| 7,551,364 B2 | 6/2009 | Bae et al. | |
| 7,580,195 B2 | 8/2009 | Choi et al. | |
| 8,072,689 B2 | 12/2011 | Bolis | |
| 8,300,317 B2 | 10/2012 | Lee et al. | |
| 8,390,939 B2 | 3/2013 | Henriksen et al. | |
| 2007/0030573 A1 | 2/2007 | Batchko et al. | |
| 2007/0201138 A1 | 8/2007 | Lo | |
| 2007/0211207 A1 | 9/2007 | Lo et al. | |

(Continued)

FOREIGN PATENT DOCUMENTS

CN  1189219 A  7/1998
CN  1 01 71 5561 A  5/2010

(Continued)

OTHER PUBLICATIONS

Communication dated Apr. 3, 2012 issued by the European Patent Office in counterpart European Patent Application No. 11181168.3.

(Continued)

*Primary Examiner* — Scott J Sugarman
(74) *Attorney, Agent, or Firm* — Sughrue Mion, PLLC (57) ABSTRACT

A vari-focal fluidic lens is provided. The fluidic lens includes a frame, an first membrane, a second membrane, and an optical fluid. The frame defines an inner space of the fluidic lens including a driving portion and a lens portion that are connected to each other. The elastic membrane is attached to one side of the frame to cover at least the lens portion. The second membrane is attached to an opposite side of the frame to cover at least the driving portion and is deformable in response to temperature change to vary a volume of the inner space. Optical fluid is contained in the inner space.

28 Claims, 10 Drawing Sheets

(56) References Cited

U.S. PATENT DOCUMENTS

| | | |
|---|---|---|
| 2007/0263293 A1 | 11/2007 | Batchko et al. |
| 2008/0112059 A1 | 5/2008 | Choi et al. |
| 2008/0144186 A1 | 6/2008 | Feng et al. |
| 2008/0285143 A1 | 11/2008 | Batchko et al. |
| 2009/0010562 A1 | 1/2009 | Chung |
| 2009/0021823 A1 | 1/2009 | Heim et al. |
| 2010/0079873 A1 | 4/2010 | Wang et al. |
| 2010/0118413 A1 | 5/2010 | Kim et al. |
| 2010/0118414 A1 | 5/2010 | Bolis |
| 2010/0182703 A1 | 7/2010 | Bolis |
| 2010/0276491 A1* | 11/2010 | Havens et al. ............ 235/470 |

FOREIGN PATENT DOCUMENTS

| | | |
|---|---|---|
| EP | 2192425 A1 | 6/2010 |
| JP | 6-308303 A | 11/1994 |
| JP | 7-49404 A | 2/1995 |
| JP | 2000-81503 A | 3/2000 |
| JP | 2006-178447 A | 7/2006 |
| JP | 2007-219521 A | 8/2007 |
| JP | 2009-175536 A | 8/2009 |
| JP | 2010-097200 A | 4/2010 |
| JP | 2010-156947 A | 7/2010 |
| JP | 2010-533886 A | 10/2010 |
| KR | 10-0672373 | 1/2007 |
| KR | 10-2008-0043106 A | 5/2008 |
| KR | 10-2008-0064237 A | 7/2008 |
| WO | 9635967 A1 | 11/1996 |
| WO | 0201277 A2 | 1/2002 |
| WO | 02/12925 A3 | 2/2002 |
| WO | WO 2007/017089 A1 | 2/2007 |
| WO | 2008/082025 A1 | 7/2008 |
| WO | WO 2008/100154 A1 | 8/2008 |
| WO | 2009/010562 A1 | 1/2009 |
| WO | 2010005315 A1 | 1/2010 |
| WO | 2010/032869 A1 | 3/2010 |

OTHER PUBLICATIONS

A. Werber, "Tunable, membrane-based,liquid-filled micro-lenses", Laboratory for Micro-optics, The 13th International Conerence on Solid-State Sensors, Actuators and Microsystems, Seoul, Koreak Jun. 5-6, 2005, vol. 1, pp. 1018-1021.
Search Report, dated Nov. 5, 2010, issued in European Patet Application No. 10171907.8.
Jeong et al. "Tunable Mircodoublet Lens Array" Optics Express 2004, vol. 12, No. 11, pp. 2494-2500.
Search Report dated Nov. 5, 2010, issued in European Patent Application No. 10171910.2.
European Patent Office, Communication dated Dec. 8, 2011, issued in corresponding European Patent Application No. 11163986.0.
Communication dated Aug. 4, 2014, issued by the State Intellectual Property Office of the People's Republic of China in counterpart Chinese Patent Application No. 201110335853.7.
U.S. Appl. No. 13/210,751.
U.S. Appl. No. 12/787,787.
U.S. Appl. No. 12/784,625.
Communication dated Mar. 3, 2015 issued by the Japanese Patent Office in counterpart Japanese Patent Application No. 2011-222134.

* cited by examiner

FLUIDIC LENS

CROSS-REFERENCE TO RELATED APPLICATION

This application claims priority from Korean Patent Application No. 10-2010-0096874, filed on Oct. 5, 2010 in the Korean Intellectual Patent Office, the disclosure of which is incorporated herein by reference in its entirety.

BACKGROUND

1. Field

Apparatuses consistent with the exemplary embodiments relate to an optical lens, and more particularly, to a fluidic lens.

2. Description of the Related Art

With the development of digital technology, digital convergence continues to increase. Digital convergence has occurred most in the fields of media and communication. An example of a product resulting from such digital convergence is a mobile communication device, in which an image pickup device such as a digital camera or a digital camcorder is coupled to the mobile communication device. In addition, such a mobile communication device can be coupled to an apparatus having functions including games, music playback, broadcast reception, and internet browsing. In general, other similar image pickup devices may be mounted on other types of mobile electronic devices such as laptop computers or personal digital assistants (PDA).

Such mobile electronic devices having an image pickup device have become increasingly compact and slim. Moreover, other digital electronic devices such as, for example, MP3 players, moving picture players or digital multimedia broadcasting (DMB) televisions, are commonly included in the mobile communication device in addition to the image pickup device. For this reason, demand for image pickup devices which are even more compact and slim is continually growing. However, such an image pickup device having focusing optics is one of the most difficult to downsize.

When image pickup apparatuses originally started to be combined with mobile electronic devices, there was not a high demand for high performance image pickup devices. However, in recent times, in order to satisfy growing user demands for mobile electronic devices having a high quality image pickup device, mobile electronic devices having an image pickup device have become diversified. For example, unlike the early days in which the limit of a close up function (provided by an image pickup device in a mobile electronic device) was 60 cm and a focal distance was fixed, in recent times, an auto-focusing function or a zoom function, and a shooting function at a close range below 30 cm have become desired by users to be provided in such an image pickup device.

In order to implement an auto-focusing function, a zoom function, and a close up function, a focal length of focusing optics needs to be adjusted. As an example of methods of varying a focal length in focusing optics, a step motor or a voice coil motor (VCM) may be used. In this case, the focal length is adjusted by varying a gap between lenses forming the focusing optics through a motor operation, thereby causing a size of the image pickup apparatus to be increased and consequently causing difficulty in mass production.

One method of overcoming such drawbacks resulting from the method using the step motor or VCM is to use a fluidic lens. The fluidic lens has a structure in which optical fluid is sealed by an optical membrane, and the curvature of the fluidic lens is adjusted by changing a pressure applied to a lens surface of the optical membrane by the optical fluid. As an example of such a fluidic lens, applicant of the instant application has filed "An optical lens and a method thereof," Korean Unexamined Patent No. 2008-004316 which is incorporated herein by reference for all purposes.

Since the fluidic lens adjusts its focal length by use of the change in curvature of a lens surface, there is no need for the change in distance between lenses forming focusing optics to adjust the focal length. Accordingly, an image pickup apparatus including a fluidic lens does not need to be provided with a step motor or VCM to move the lenses forming the focusing optics and does not require an extra space set to move the lens, thereby ensuring a small structure. In addition, the fluidic lens disclosed in Korean Unexamined Patent No. 2008-004316 is more suitable for mass production, and requires less in manufacturing cost.

Meanwhile, most of the electronic equipment including mobile electronic equipment is designed to operate in a predetermined temperature range. The operation temperature of electronic equipment may vary depending on the intended use and functions of the electronic equipment, typically ranging from −20 to 60 degrees Celsius. The image pickup apparatus having a fluidic lens also operates in this range of operation temperature.

Optical fluid used in the fluidic lens has a higher thermal expansion coefficient than other components forming the fluidic lens, and causes higher change in volume according to temperature change. The focal distance of the fluidic lens is adjusted by the change in curvature of a lens surface. The curvature of a lens surface is changed by a pressure applied to an optical membrane by optical fluid. However, as noted above, the curvature of a lens surface may be changed according to temperature change, causing the focal distance to be changed. Such an unintended change of the focal distance may cause abnormal operation of the fluid lens in a predetermined temperature range (for example, ranging from −20 degrees to −60 degrees Celsius).

SUMMARY

One or more exemplary embodiments provide a fluidic lens ensuring normal operation regardless of temperature change.

Further, one or more exemplary embodiments provide a fluidic lens having an invariable focal distance even if the volume of optical fluid changes in response to temperature change.

According to an exemplary embodiment, there is provided a fluidic lens including a frame, e.g., a spacer frame, a first membrane, a second membrane, and an optical fluid. The frame defines an inner space of the fluidic lens including a driving portion and a lens portion that are connected to each other. The optical fluid is contained in the inner space. The first membrane is attached to one side of the frame to cover at least the lens portion. The second membrane is attached to an opposite side of the frame to cover at least the driving portion and is deformable in response to temperature change to vary a volume of the inner space.

The second membrane may cover the lens portion in addition to the driving portion, and the fluidic lens may further include a stiffening frame disposed on a portion of the second membrane corresponding to the lens portion.

According to an exemplary embodiment, there is provided a fluidic lens including a first frame, an optical fluid, an first membrane, and a second membrane. The first frame defines an inner space of the fluidic lens including a driving portion and a lens portion that are connected to each other, and the lens portion is disposed in a center of the first frame and the driving portion surrounds the lens portion. The optical fluid is contained in the inner space. The first membrane is attached to one side of the spacer frame to cover a first opening of the inner space defined by the first frame. The second membrane is attached to a second side of the spacer frame to cover a second opening of the inner space defined by the first frame and deformable in response to temperature change to vary a volume of the inner space.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, the exemplary embodiments will be described with reference to accompanying drawings.

Elements, features, and structures are denoted by the same reference numerals throughout the drawings and the detailed description, and the size and proportions of some elements may be exaggerated in the drawings for clarity and convenience.

Figure 1:
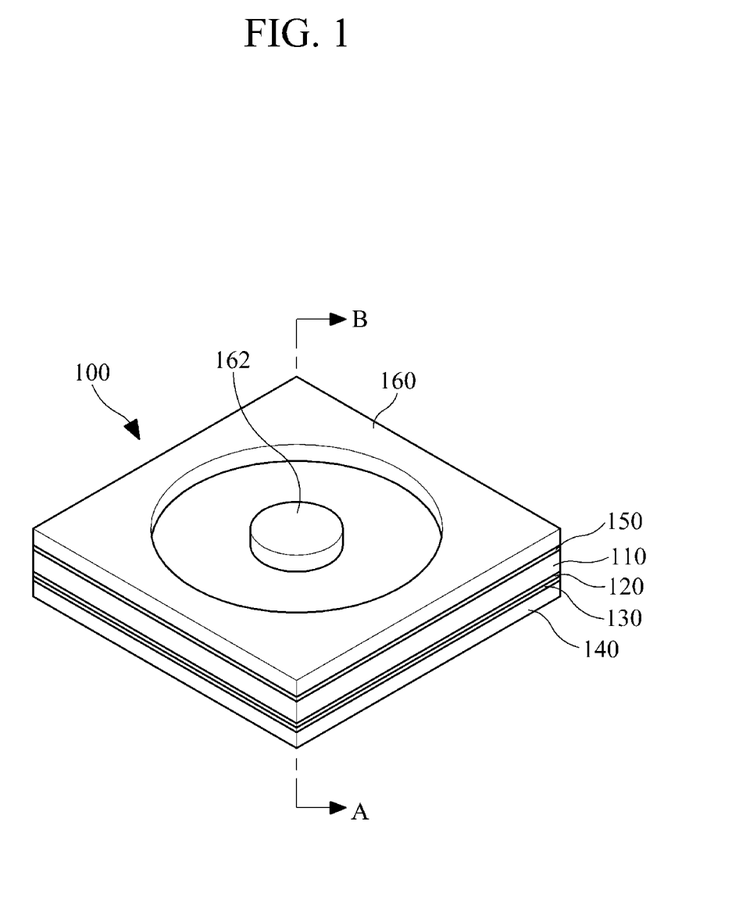
FIG. 1 is a perspective view illustrating a fluidic lens according to an exemplary embodiment.
Figure 2:
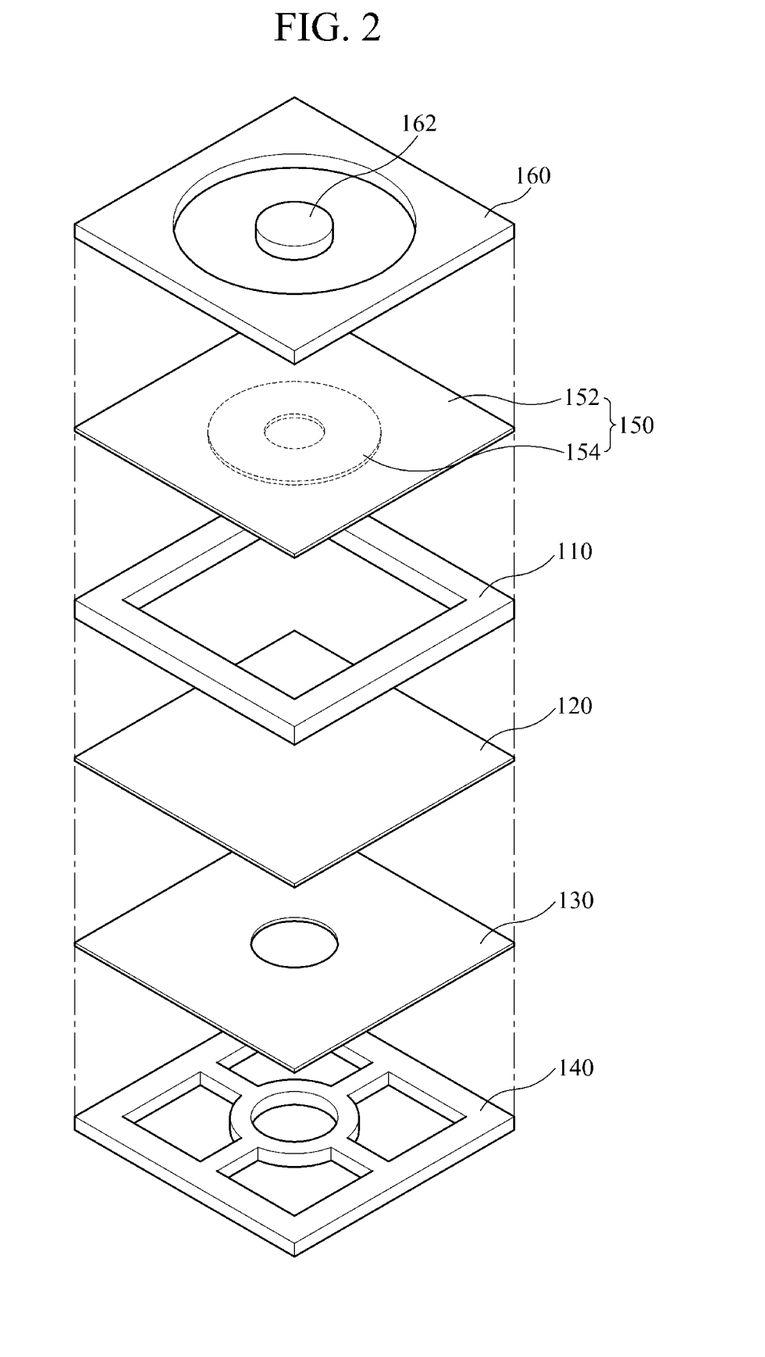
FIG. 2 is an exploded perspective view illustrating the fluidic lens shown in FIG. 1.
Figure 3:
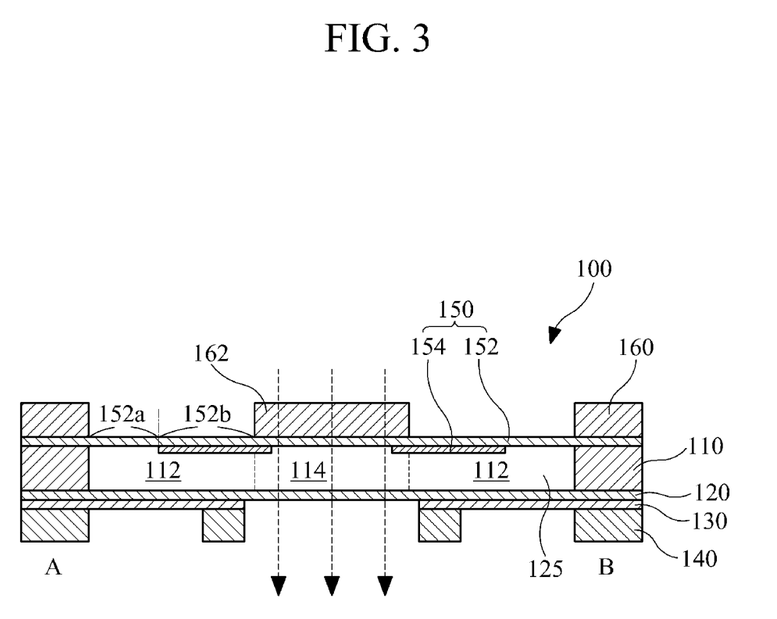
FIG. 3 is a cross sectional view taken along line A-B of FIG. 1.

FIG. 1 is a perspective view illustrating a fluidic lens according to an exemplary embodiment, FIG. 2 is an exploded perspective view illustrating the fluidic lens shown in FIG. 1, and FIG. 3 is a cross sectional view taken along line A-B of FIG. 1. As shown in FIGS. 1 to 3, a fluidic lens 100 includes a spacer frame 110, an elastic membrane 120, an actuator 130, a thermally deformable membrane 150, and an optical fluid 125. In addition, the fluidic lens 100 further includes a stiffening frame 162, an actuator frame 140, and a supporting frame 160. FIGS. 1 to 3 illustrate a state of the fluidic lens 100 at a normal temperature, for example, 20° C. The shape of the fluidic lens 100 may be changed with the increase or decrease of temperature, and details of the change of the fluidic lens 100 will be described later with reference to FIGS. 4A and 4B.

The fluidic lens 100 may be used alone or added to focusing optics of an image pick-up device. In the former case, the fluidic lens is capable of changing its focal distance by itself. In the latter case, the focal distance of the focusing optics is changed using the fluidic lens 100. The fluidic lens 100 allows a variable focus function, such as an auto-focus function, a zoom function, and a close up function based on the change of a focal distance to be implemented on an image pickup device.

The spacer frame 110 defines the inner space of the fluidic lens 100 that can be filled with optical fluid 125. To this end, the spacer frame 100 may include a sidewall to surround the inner space. A top side opening and a bottom side opening of the inner space formed by the sidewall may be covered by the elastic membrane 120 and the thermally deformable membrane 150, respectively. In this case, a circumferential face of the inner space is defined by the spacer frame 100, the thermally deformable membrane 150, and the elastic membrane 120. The spacer frame 110 may be formed using rigid material such as silicon and transparent or opaque material.

The inner space defined by the spacer frame 110 is divided into a driving portion 112 and a lens portion 114. The inner space may be divided in a virtual aspect or a real aspect. According to this exemplary embodiment, the fluidic lens 100 shown in FIGS. 1 to 3 is divided in a virtual aspect. In this case, the spacer frame 110 consists of sidewalls and the inner space has a cylindrical shape or a rectangular parallelepiped shape. The subdivision of the inner space into the driving portion 112 and the lens portion 114 may be made in an aspect of functionality, for example, dependent on which portion is pushed by the actuator 130, or made by the relationship of other components adjacent to the spacer frame 110. For example, a portion of the inner space corresponding to the actuator 130 serves as the driving portion 112, and a portion of the inner space corresponding to the stiffening frame 162 serves as the lens portion 114.

Figure 7:
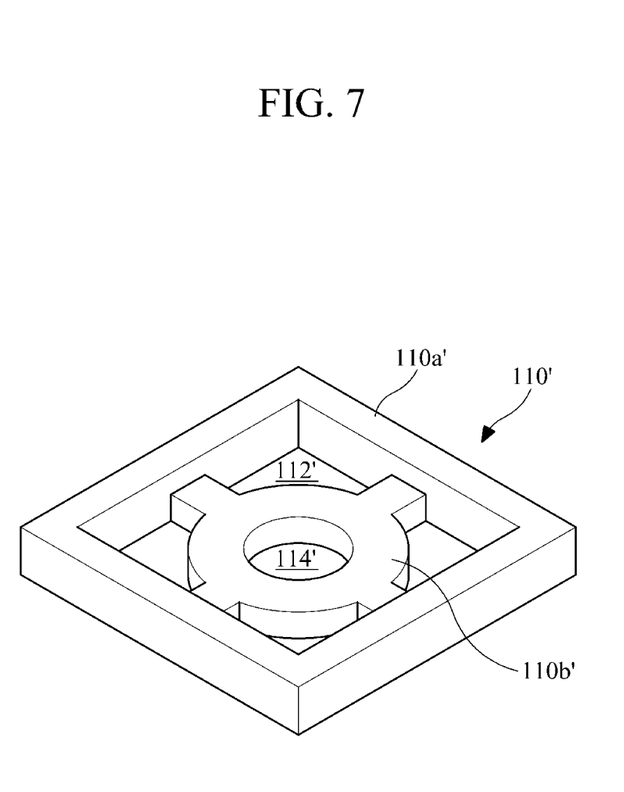
FIG. 7 is a perspective view illustrating a spacer frame according to an exemplary embodiment.

Alternatively, the subdivision into the driving portion and the lens portion may be made in a physical aspect by another component forming the spacer frame 110. FIG. 7 is a perspective view illustrating an example of a spacer frame having the other component, according to another exemplary embodiment. As shown in FIG. 7, a spacer frame 110' may include a sidewall 110a' to define the inner space of the fluidic lens 100 and a subsidiary frame 110b' configured to divide the inner space into a driving portion 112' and a lens portion 114'. In further detail, a lower portion of the inner space may be divided into the driving portion 112' and the lens portion 114' by the subsidiary frame 110b' and an upper portion of the inner space may be opened laterally over the entire spacer frame 110'. The opened upper portion allows optical fluid to freely move in the spacer frame 110'.

Referring again to FIGS. 1 to 3, the lens portion 114 is filled with the optical fluid 125 and serves as a lens through which incident light passes. The driving portion 112 serves to transfer a driving force capable of varying the profile of a portion (a lens surface) of the elastic membrane 120. In further detail, if a predetermined pressure, for example, a predetermined pressure produced by the actuator 130, is applied to the optical fluid 125 in the driving portion 112, the optical fluid 125 in the driving portion 112 moves to the lens portion 114. As a result, the inflow of the optical fluid 125 increases the amount of optical fluid 125 in the lens portion 114, increasing the pressure applied to a portion of the elastic membrane 120. That is, a portion of the elastic membrane 120 in the lens portion 114 bulges upward, that is, deforms in the form of a convex lens. An elastic modulus of the lens portion 114 is adjusted by adjusting the pressure applied to the optical fluid 125 by the actuator 130.

The lens portion 114 is located in the middle of the inner space of the fluidic lens 100, and the driving portion 112 surrounds the lens portion 114. Since the driving portion 112 is disposed to surround the lens portion 114, if the actuator 130 operates, the optical fluid 125 in the driving portion 112 is equally introduced from all directions to the lens portion 114. The deformed shape of the lens portion 114 is provided in the form of a convex lens, which is almost spherical and axisymmetric about an optical axis, and the fluid lens 100 offers superior optical performance. The driving portion 112 may be provided in a unitary area or may be provided in a plurality of subdivided areas. For example, the driving portion 112 may be divided into four areas or more so the divided areas are symmetrical to each other around an optical axis (e.g., see FIG. 7 for four divided areas).

The optical fluid 125 is filled in the inner space defined by the spacer frame 110, and sealed by the elastic membrane 120 and the thermally deformable membrane 150 that are attached to either side of the spacer frame 110. The optical fluid 125 is formed of transparent silicon oil which has a low viscosity and is made of a unit polymer having a great molecular weight. For example, if the optical fluid 125 is formed using transparent silicon oil that has a degree of polymerization of 50 at a viscosity of 1000 cP or below, the fluidic lens 100 offers a response time required in the fluidic lens 100. The optical fluid 125 may be formed using dimethyl siloxane (DMS) oil and dimethyl based silicon oil containing a great amount of methyl groups.

The elastic membrane 120 is attached to one side of the spacer frame 110 to cover at least the lens portion 114 of the inner space defined by the spacer frame 110. A portion of the elastic membrane 120 covering the lens portion 114 forms a lower lens surface of the fluidic lens 100. The elastic membrane 120 may cover the driving portion 112 of the inner space in addition to the lens portion 114, and the elastic membrane 120 is provided in the form of a single sheet. However, the driving portion 112 of the inner space may be covered by another elastic membrane or other components. The elastic membrane 120 is formed using transparent silicon elastomer in a single film structure or a double film structure.

The actuator 130 may be disposed on the elastic membrane 120 to correspond to the driving portion 112. The actuator 130 may be provided in a unitary structure or may be divided into a plurality of parts. The actuator 130 may be bonded to the elastic membrane 130 by a predetermined bonding member. The actuator 130 receives a predetermined driving voltage and exerts a pressure on the optical fluid 125 in the driving portion 112 such that the inflow of optical fluid 125 is made to direct to the lens portion 114. As a result, the elastic membrane 120 in the lens portion 114 has a convex shape. The actuator 130 may be an example of a pressure member that allows the optical fluid 125 in the driving portion 112 to move to the lens portion 114 to push a portion of the elastic membrane 120 corresponding to the lens portion 114 outward.

Instead of the actuator 130, a micro-pump may be used to move the optical fluid 125 in the driving portion 112 toward the lens portion 114. Alternatively, the actuator 130 may remain in a flat state without a driving voltage applied thereto and may be configured to be bent toward the driving portion 112 of the inner space (upward in FIG. 3) when a driving voltage is applied. In this case, the extent of deformation of the actuator 130 may be controlled by adjusting the intensity of the driving voltage.

The actuator 130 may be provided in various types using various materials. The actuator 130 is formed using any actuator generally known in the related art. For example, the actuator 130 may be an electrode active polymer (EAP) actuator which is very thin and consumes low power or a relaxor ferroelectric polymer actuator made of a copolymer such as P(VDF-TrFE-CFE) and P(VDF-TrFE-CFTE).

The actuator frame 140 serving as a fixing frame is disposed on the actuator 130 to securely fix the elastic membrane 120 and/or the actuator 130 to the spacer frame 110. The actuator frame 140 has a planar shape that exposes at least a portion of the elastic membrane 120 corresponding to the lens portion 114 and also may expose the actuator 130. The actuator frame 140 has a planar shape which is symmetrical around an optical axis. The material of the actuator frame 140 is not limited. For example, the actuator frame 140 may be formed using rigid material such as silicon or plastic.

The thermally deformable membrane 150 is attached to another side of the spacer frame 110, that is, the other side opposite to the one side of the spacer frame 110 having the elastic membrane 120 attached thereto. The thermally deformable membrane 150 covers at least the driving portion 112 of the inner space defined by the spacer frame 110. The thermally deformable membrane 150 may cover the lens portion 114 of the inner space in addition to the driving portion 112, and the thermally deformable membrane 150 is provided in the form of a single sheet. A portion of the thermally deformable membrane 150 covering the lens portion 114 forms an upper lens surface of the fluidic lens 100.

The optical fluid 125 formed using silicon oil has a thermal expansion coefficient of about 330 ppm/° C. A general fluidic lens (see FIG. 8) includes a glass substrate which serves as a substitution for the thermally deformable membrane 150, the supporting frame 160 and the stiffening frame 162 of the fluidic lens 100. Under a predetermined temperature change of 40° C., for example, with the temperature increasing from 20° C. to 60° C. and the temperature decreasing from 20° C. to −20° C., the general fluidic lens has an elastic modulus ranging from −134 μm to 134 μm. That is, if the room temperature increased or decreased by 40° C., a portion of the elastic membrane 120 corresponding to the lens portion 114 deforms to become bulged or recessed by a maximum deformation of 134 μm. However, the elastic membrane 120 has a critical elastic modulus ranging from −15 μm to +15 μm, which is allowable when the actuator 130 properly adjusts a focal distance of the fluidic lens 100, so it is difficult for the general fluidic lens to maintain the focal distance in a predetermined level at a normal operation temperature range of electronic equipment of about −20° C. to 60° C.

In order to adjust the focal distance to a level which is required in the fluidic lens 10 at a normal operation temperature of electronic equipment, an exemplary embodiment of the fluidic lens 10 includes the thermally deformable membrane 150. In further detail, the thermally deformable membrane 150 deforms to vary a volume of the inner space to correspond to a temperature change. The thermally deformable membrane 150 bulges outward (upward in FIG. 3) to increase the volume of the inner space in response to an increase in temperature, and bulges inward (downward in FIG. 3) to decrease the volume of the inner space in response to a decrease in temperature. Accordingly, since the thermally deformable membrane 150 is deformed, as the temperature increases, the optical fluid 125 is filled in the inner space which is further expanded by the deformation of the thermally deformable membrane 150 and as the temperature decreases, the optical fluid 125 is filled in the inner space which is further reduced by the deformation of the thermally deformable membrane 150. That is, the thermally deformable membrane 150 compensates for the volume change of the optical fluid 125 according to temperature change.

Figure 4A:
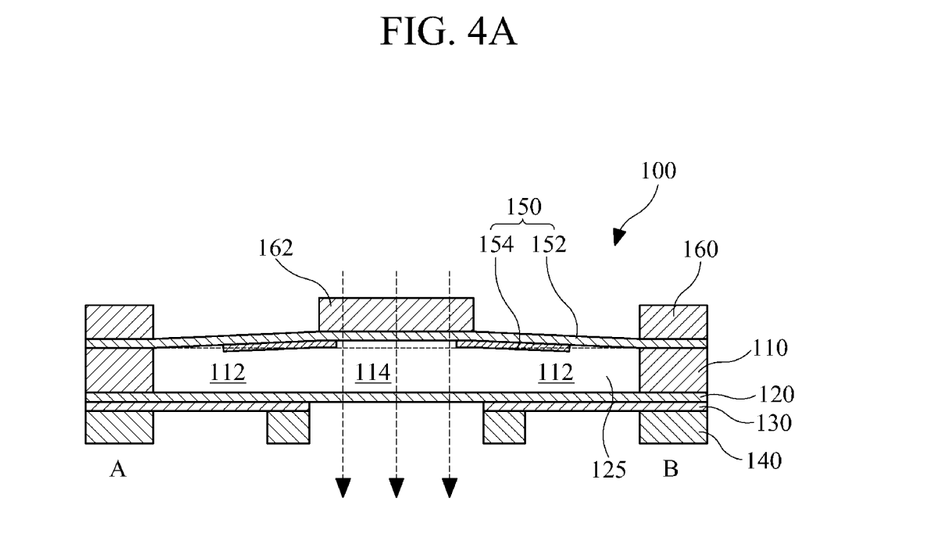
FIG. 4A is a cross sectional view showing a state of the fluidic lens of FIG. 3 deformed with the increase of temperature.
Figure 4B:
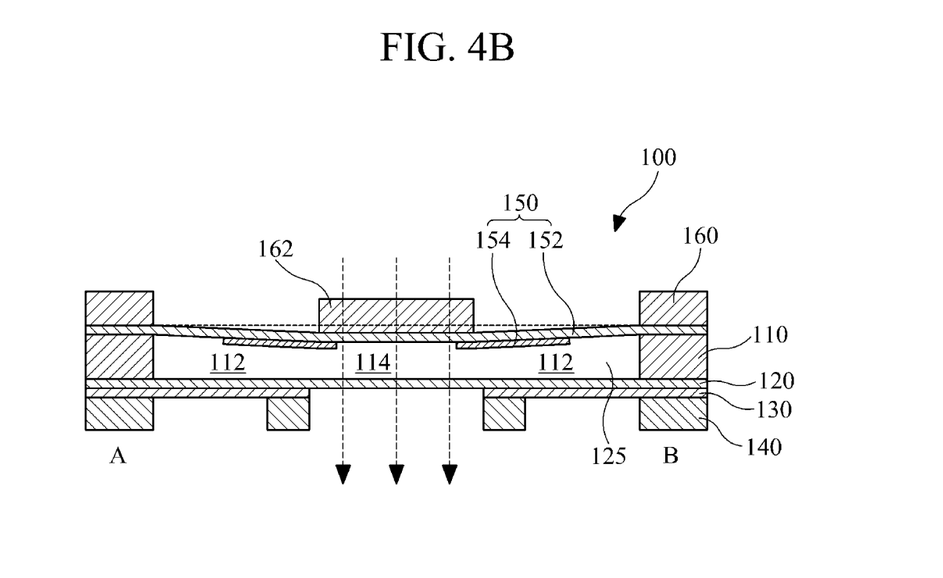
FIG. 4B is a cross sectional view showing a state of the fluidic lens of FIG. 3 deformed with the decrease of temperature.

FIG. 4A is a cross sectional view showing a state of the fluidic lens 100 of FIG. 3 performing a bending deformation in response to an increase of temperature, and FIG. 4B is a cross sectional view showing a state of the fluidic lens of FIG. 3 performing a bending deformation in response to a decrease of temperature. As shown in FIG. 4A, with the increase of temperature, the thermally deformable membrane 150 of the fluidic lens 100 performs a bending deformation outward. As shown in FIG. 4B, with the decrease of temperature, the thermally deformable membrane 150 of the fluidic lens 100 performs a bending deformation inward. However, since an edge portion of the thermally deformable membrane 150 is fixed to the spacer frame 110 by the supporting frame 160, if the thermally deformable membrane 150 performs a bending deformation, a middle portion of the thermally deformable membrane 150 covering the driving portion 112 and the lens portion 114 may bulge outward (see FIG. 4A) or may bulge inward (see FIG. 4B).

As a method of performing a bending deformation in the thermally deformable membrane 150 according to temperature change, the thermally deformable membrane 150 includes two materials having thermal expansion coefficients exhibiting a great difference. In further detail, the thermally deformable membrane 150 has a double film structure including a first membrane 152 formed using a polymer material having a great thermal expansion coefficient such as polyimide (PI) or polyether sulfone (PES), and a second membrane 154 formed using a metal having a small thermal expansion coefficient such as invar, molybdenum (Mo), and copper (Cu). The material of the first membrane 152 is not limited to a polymer, and may be formed using any material having a relatively large thermal expansion coefficient. Similarly, the material of the second membrane 154 is not limited to a metal, and may be formed using any material having a relatively small thermal expansion coefficient. The PI has a thermal expansion coefficient of about 58 ppm/° C., and invar, molybdenum and copper have thermal expansion coefficients of about 1.5 ppm/° C., 4.8 ppm/° C. and 16.4 ppm/° C., respectively.

In order to perform a bending deformation in the thermally deformable membrane 150, the second membrane 154 has an area smaller than that of the first membrane 152 such that the second membrane 154 is bonded to a first portion 152b of the first membrane 152. For example, the first membrane 152 may be provided in the form of a single sheet covering the driving portion 112 and the lens portion 114 of the inner space. The second membrane 154 may have a size to cover only a portion of the driving portion 112, for example, a size as large as the first portion 152b of the first membrane 152. That is, the second membrane 154 is bonded to the first portion 152b of the first membrane 152 other than a second portion 152a of the first membrane 150. Since the second membrane 154 inhibits the first membrane 152 from being expanded or contracted, the second portion 152a of the first membrane 152, to which the second membrane 154 is not bonded, expands or contracts to a greater degree compared to the first portion 152b. Accordingly, the thermally deformable membrane 150 may be bent outward or inward at the first portion 152b.

In this manner, the fluidic lens 100 having the thermally deformable membrane 150 compensates for the volume change of the optical fluid 125 depending on temperature. The thermally deformable membrane 150 is deformed not because of a resultant factor of the temperature change but simply because of the temperature change. That is, the thermally deformable membrane 150 is deformed not because of the pressure, which is produced by the volume change of optical fluid 125 according to temperature change. Rather, the deformation of the thermally deformable membrane 150 directly caused by the temperature change allows the volume of the inner space to increase or decrease, and the volume change of the inner space caused by the deformation of the thermally deformable membrane 150 prevents or minimizes the change in pressure applied to the elastic membrane 120 by the optical fluid 125 even if the temperature changes. Accordingly, in a normal operation temperature of electronic equipment, optical power of the lower lens surface, which is defined by the elastic membrane 120, does not change or changes to a predetermined level or below.

As shown in FIGS. 2 and 3, the second membrane 154 covering a part of the driving portion 112 may not cover the lens portion 114. In this case, the upper lens surface is defined only by the first membrane 152. For example, the second membrane 154 is provided in a ring shape (see FIG. 2), which covers a part of the driving portion 112 while having an optical axis as the center. When viewed in a plan view, the first portion 152b of the first membrane 152 is surrounded by the second portion 152a of the first membrane 152, and the second membrane 154 is disposed to correspond to an inner portion of the driving portion 112.

If the second membrane 154 does not cover the lens portion 114, a portion of the thermally deformable membrane 150, which corresponds to the lens portion 114 and represents the upper lens surface, is provided in a single membrane formed of the first membrane 152. Similar to the second membrane 154, the upper lens surface may deform to a larger degree compared to the first portion 152a. As a result, the upper lens surface deforms to be convex or concave with the temperature change, causing optical power of the fluidic lens 100 to be changed. To prevent optical power of the fluidic lens 100 from being changed, the second membrane 154 is formed to cover the lens portion 114. The second membrane 154 is formed using a light transmitting material.

The stiffening frame 162 is configured to prevent the upper lens surface from being deformed, and the stiffening frame 162 is disposed on a portion of the thermally deformable membrane 150 corresponding to the lens portion 114. Accordingly, the stiffening frame 162 may be formed using a material such as glass, which is transparent and not deformable in a normal operation temperature of electronic equipment. Alternatively, the stiffening frame 162 may be formed using a polymer material such as PI in a thickness significantly larger than that of the first membrane 152 to resist against heat.

The supporting frame 160 fixes an edge portion of the thermally deformable membrane 150 to the spacer frame 110. The supporting frame 160 defines a deformation area of the thermally deformable membrane 150. The material of the supporting frame 160 is not limited and may be formed using silicon or the same material as the stiffening frame 162. The supporting frame 160 may have an opening part which enables the thermally deformable membrane 150 to be deformed. When viewed in a plan view, the opening part may have a circular shape as shown in FIG. 2. The shape of the opening part is not limited thereto. If the opening part of the thermally deformable membrane 150 has a circular shape, the thermally deformable membrane 150 may be deformed symmetrically around the optical axis.

Figure 5:
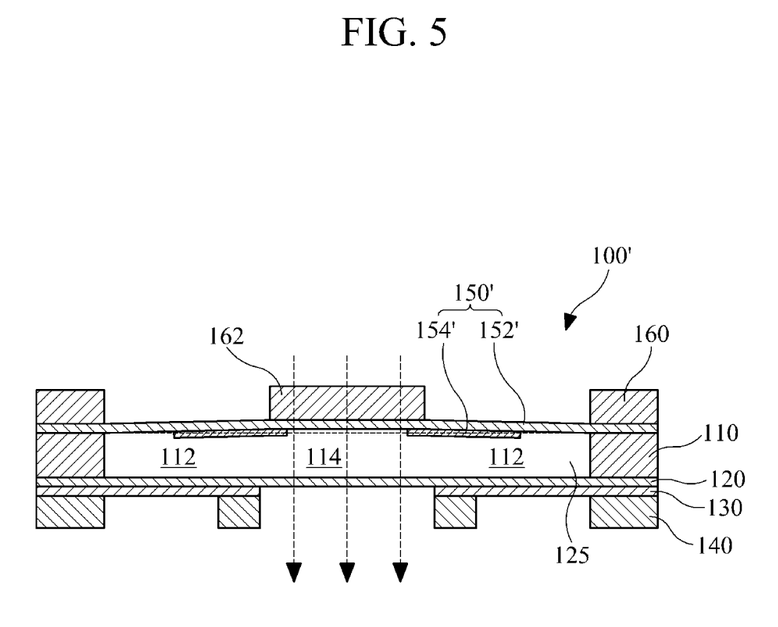
FIG. 5 is a cross sectional view illustrating a fluidic lens according to another exemplary embodiment.

FIG. 5 is a cross sectional view illustrating a variation of the fluidic lens of FIGS. 1-3 at room temperature, according to another exemplary embodiment. As shown in FIG. 5, a fluidic lens 100' includes a spacer frame 110, an elastic membrane 120, an actuator 130, an actuator frame 140, a thermally deformable membrane 150', a stiffening frame 162, a supporting frame 160 and an optical fluid 125. The details of elements identical to those of the fluid lens 100 shown in FIG. 3 will be omitted in order to avoid redundancy. Unlike the fluid lens 100 shown in FIG. 3, the fluidic lens 100' has a structure in which a middle portion of the thermally deformable membrane 150', that is, a portion of the thermally deformable membrane 150' on which the stiffening frame 162 is disposed, protrudes beyond an edge portion of the thermally deformable membrane 150' on which the supporting frame 160 is disposed. A method of providing such an initial deformation to the thermally deformable membrane 150' is not limited.

The initial deformation is provided to the thermally deformable membrane 150' to allow the thermally deformable membrane of the fluidic lens 100 to sufficiently compensate for the change of the optical fluid 125 in volume at a low temperature range of −20° C. to 20° C. Details of application of the initial deformation will described with reference to FIGS. 8 and 9. When the temperature decreases from room temperature of 20° C., the thermally deformable membrane 150 of the fluidic lens 100 (see FIG. 3) may not deform to a sufficient extent. That is, the deformation of the thermally deformable membrane 150 of the fluidic lens 100 in FIG. 3 performed to decrease the volume of the inner space may be not enough to completely compensate for the change of the optical fluid 125 in volume. As a result, the lower lens surface of the fluidic lens 100 deforms beyond a predetermined critical value of −15 μm, failing to provide a desired focal distance. However, the thermally deformable membrane 150' shown in FIG. 5 has the initial deformation applied thereto and sufficiently compensates for the change of the optical fluid 125 in volume.

Figure 6A:
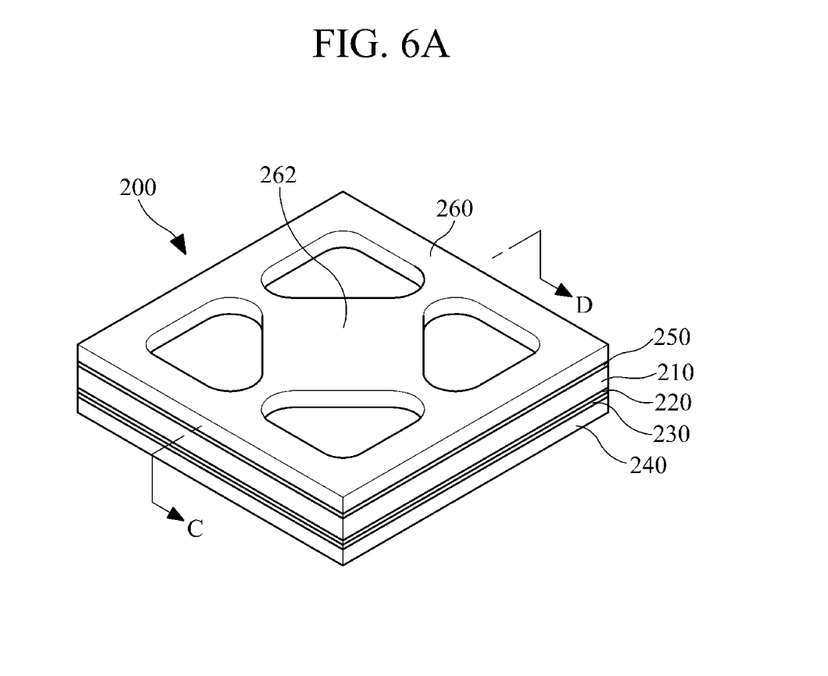
FIG. 6A is a perspective view illustrating a fluidic lens according to another exemplary embodiment.
Figure 6B:
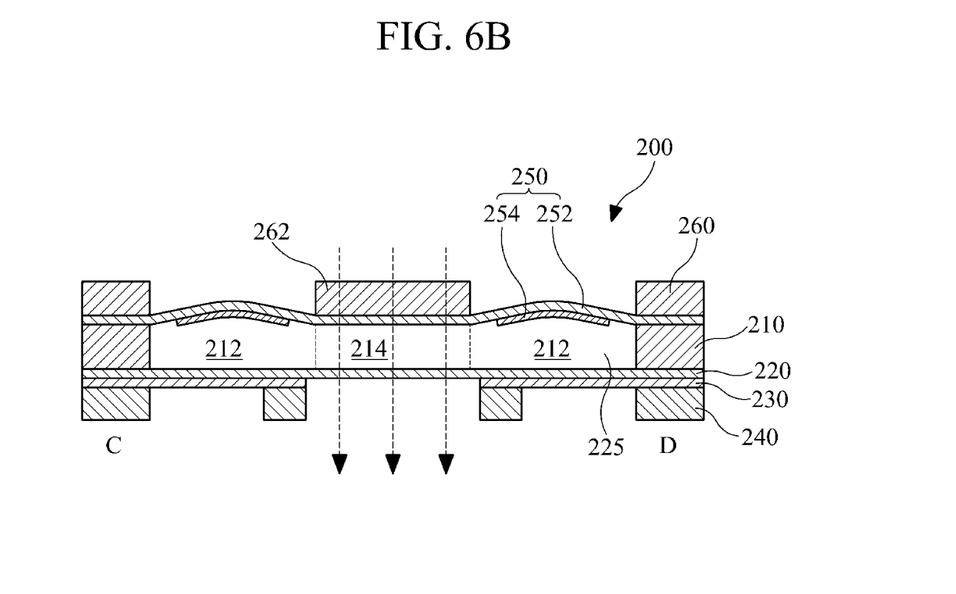
FIG. 6B is a cross sectional view taken along line C-D of FIG. 6A.

FIG. 6A is a perspective view illustrating another exemplary embodiment of a fluidic lens, and FIG. 6B is a cross sectional view taken along line C-D of FIG. 6A. As shown in FIGS. 6A and 6B, a fluidic lens 200 includes a spacer frame 210, an elastic membrane 220, an actuator 230, an actuator frame 240, a thermally deformable membrane 250, a supporting membrane 260, a stiffening frame 262, and an optical fluid 225. The details of elements identical to those of the fluidic lens 100 shown in FIG. 1 will be omitted in order to avoid redundancy. The fluidic lens 200 is different from the fluidic lens 100 in that an initial deformation is provided to the thermally deformable membrane 250. In addition, the structure of the supporting frame 260 and the stiffening frame 262 and the position of a second membrane 254 forming the thermally deformable membrane 250 are different from those of the fluidic lens 100. Hereinafter, the description of the fluid lens 200 will be made in relation to such different points.

The spacer frame 210 defines a predetermined inner space of the fluidic lens 200 that can be filled with optical fluid 225. To this end, the spacer frame 200 may include a sidewall to surround the inner space and formed using rigid material such as silicon. The inner space defined by the spacer frame 210 is divided into a driving portion 212 and a lens portion 214. The inner space may be divided in a virtual aspect or a real aspect (see FIG. 7). The lens portion 214 is filled with the optical fluid 225 and serves as a lens through which incident light passes. The driving portion 212 serves to transfer a driving force capable of varying the profile of a portion (a lens surface) of the elastic membrane 220 covering the lens portion 214. The lens portion 214 in the inner space may be disposed in the middle of the fluidic lens 200, and the driving portion 212 may be disposed to surround the lens portion 214. The optical fluid 225 is filled in the inner space defined by the spacer frame 210 and sealed by the elastic membrane 220 and the thermally deformable membrane 250 that are attached on either side of the spacer frame 210.

The elastic membrane 220 is attached to one side of the spacer frame 210 to cover at least the lens portion 214 of the inner space defined by the spacer frame 210. A portion of the elastic membrane 220 covering the lens portion 214 forms a lower lens surface of the fluidic lens 200. The elastic membrane 220 is formed using transparent silicon elastomer. The actuator 230 may be disposed on the elastic membrane 220 to correspond to the driving portion 212. The actuator 230 receives a predetermined driving voltage and exerts a pressure on the optical fluid 225 in the driving portion 212 such that the inflow of optical fluid 225 directed towards the lens portion 214. The actuator 230 may be provided in various types using various materials. The actuator 230 is formed using any actuator generally known in the related art. For example, the actuator 230 may be a relaxor ferroelectric polymer actuator made of a copolymer such as P(VDF-TrFE-CFE) and P(VDF-TrFE-CFTE). The actuator frame 240 serving as a fixing frame is disposed on the actuator 230 to securely fix the elastic membrane 220 and/or the actuator 230 to the spacer frame 210.

The thermally deformable membrane 250 is attached to another side of the spacer frame 210, that is, the other side opposite to the one side of the spacer frame 210 having the elastic membrane 220 attached thereto. The thermally deformable membrane 250 covers at least the driving portion 212 of the inner space defined by the spacer frame 210. The thermally deformable membrane 250 may cover the lens portion 214 of the inner space in addition to the driving portion 212, and the thermally deformable membrane 250 is provided in the form of a single sheet. The thermally deformable membrane 250 deforms to vary a volume of the inner space to correspond to a temperature change, thereby compensating for the change of the optical fluid 225 in volume according to temperature change.

The thermally deformable membrane 250 includes two materials having thermal expansion coefficients exhibiting a great difference. In further detail, the thermally deformable membrane 250 has a double film structure including a first membrane 252 formed using a material having a great thermal expansion coefficient, and a second membrane 254 formed using a material having a small thermal expansion coefficient. In order to perform a bending deformation in the thermally deformation membrane 250, the second membrane 254 has an area smaller than that of the first membrane 252 such that the second membrane 254 is bonded to a portion of the first membrane 252. That is, the second membrane 254 may be bonded to the middle portion of the first membrane 252 corresponding to the driving portion 212. The thermally deformable membrane 250 has an initial deformation applied thereto and thus a portion of the thermally deformable membrane 250 corresponding to the driving portion 212 bulges outward (upward in FIG. 6B).

Figure 6C:
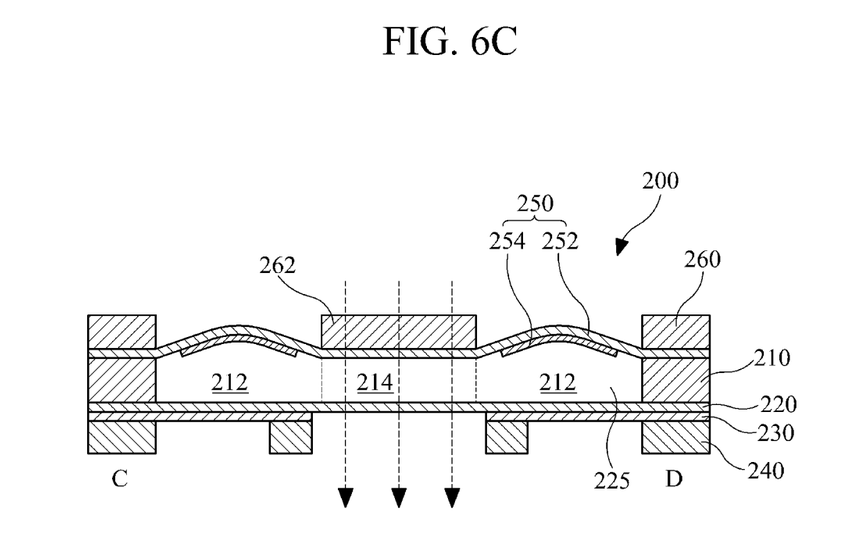
FIG. 6C is a cross sectional view showing a state of the fluidic lens of FIG. 6A deformed with the increase of temperature.
Figure 6D:
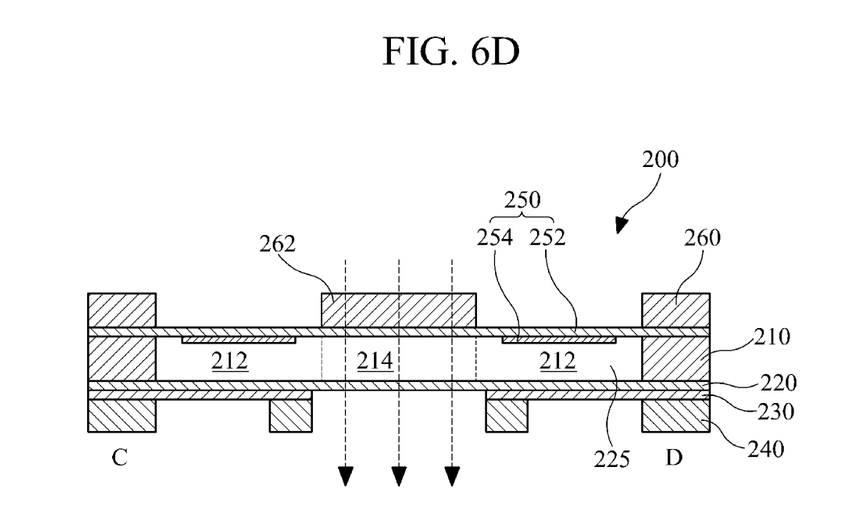
FIG. 6D is a cross sectional view showing a state of the fluidic lens of FIG. 6A deformed with the decrease of temperature.

In this case, if the temperature changes, a portion of the first membrane 252, which corresponds to the driving portion 212 and to which the second membrane 254 and the stiffening frame 262 are not bonded, performs a bending deformation, and the portion of the first membrane 252 corresponding to the driving portion 212 exhibits a great deformation compared to remaining portions of the first membrane 252 to which the second membrane 254 and the stiffening frame 262 are bonded. The structure of the fluidic lens 200 deformed with the change of temperature is illustrated in FIGS. 6C and 6D. FIG. 6C is a cross sectional view showing a state of the fluidic lens 200 deformed with the increase of temperature from 20° C. to 60° C., and FIG. 6D is a cross sectional view showing a state of the fluidic lens 200 deformed with the decrease of temperature from 20° C. to −20° C. As shown in FIGS. 6C and 6D, with the temperature change, the thermally deformable membrane 250 deforms to compensate the change of the optical fluid 225 in volume. Accordingly, a portion of the elastic membrane 220 corresponding to the lens portion 212, that is, the lower lens surface, shows almost no change in shape.

Referring again to FIGS. 6A and 6B, the stiffening frame 262 is configured to prevent the upper lens surface, which is defined by the thermally deformable membrane 250, from being deformed and disposed on a portion of the thermally deformable membrane 250 corresponding to the lens portion 214. The supporting frame 260 fixes an edge portion of the thermally deformable membrane 250 to the spacer frame 210. Unlike the fluidic lens 100 described above, the stiffening frame 262 is integrally formed with the supporting frame 260 in the fluidic lens 200, and this simplifies the manufacturing process of the fluidic lens 200 and enhances the efficiency of preventing the upper lens surface from being deformed.

Figure 8:
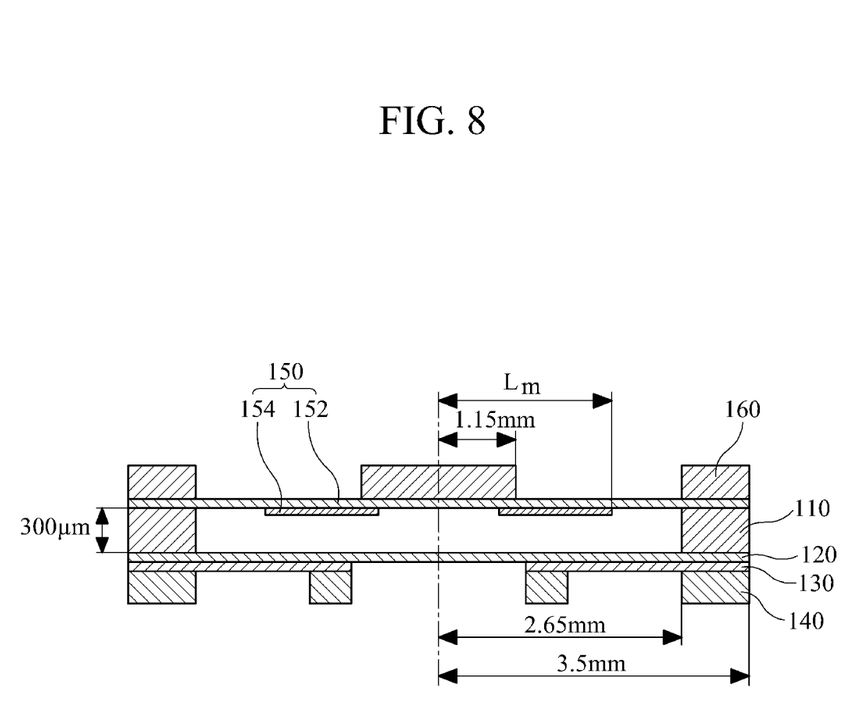
FIG. 8 is a view illustrating the structure and dimensions of the fluidic lens that is used in a simulation and test according to an exemplary embodiment.

Hereinafter, a result of a simulation and a test on the fluidic lens will be shown with reference to FIGS. 8 and 9. FIG. 8 is a view illustrating the structure and dimensions of the fluidic lens used in the simulation and the test. The simulation was performed by use of ABAQUS Ver. 6. 8 CAE & Standard dedicated to Finite Element Analysis (FEA). In this simulation, a linear thermoelastic deformation analysis was performed in consideration of nonlinear geometry while excluding a pressure produced by optical fluid. In this simulation and test, the fluidic lenses 100 described with reference to FIGS. 1 to 3 were used. Detailed dimensions of the fluidic lens 100 are shown in FIG. 8. The first membrane 152 forming the thermally deformable membrane 150 is formed using PI at a thickness of 100 μm. The second membrane 154 is formed using invar, molybdenum (Mo), or copper (Cu) at a thickness of 1 μm. The temperature change is given in two conditions of a temperature decrease from 20° C. to −20° C., and a temperature increase from 20° C. to 60° C., that is total temperature change of −20 to 60 corresponding to a normal operational temperature range of electronic equipment.

Figure 9:
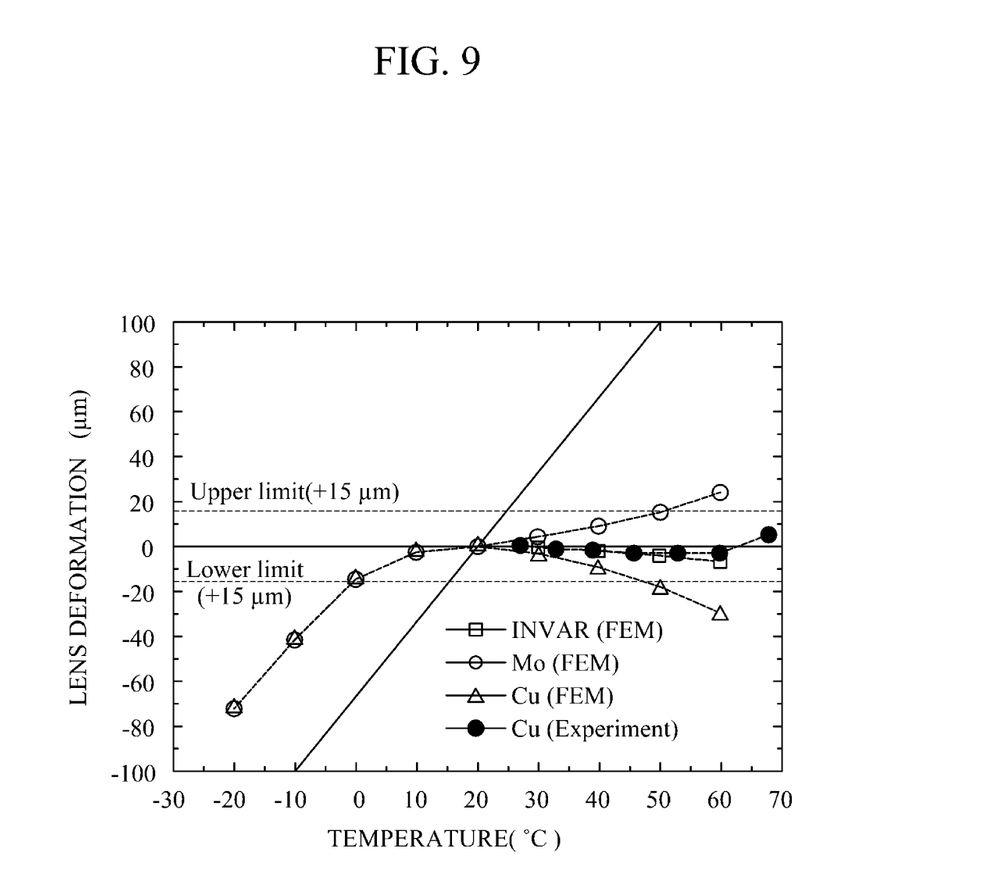
FIG. 9 is a graph showing a result of the simulation and test.

FIG. 9 is a graph showing a result of the simulation and test. FEM denotes a finite element analysis method, an oblique solid line represents the deformation of the lower lens surface of a general fluidic lens. As shown in FIG. 9, with the increase of temperature from 20° C. to 60° C., in the case of most types of metals, the lower lens surface of the fluidic lens exhibits a small extent of deformation and the deformation falls within a predetermined critical range of −15 μm to +15 μm. This means that the change of optical fluid in volume is sufficiently compensated through the deformation of the thermally deformable membrane. Meanwhile, when the temperature decreases from 20° C. to −20° C., even if the variation of deformation of the lower lens surface is smaller than that of the general fluidic lens, the deformation is out of the critical range of −15 μm to +15 μm. This is because, in the low temperature range, in particular, 0° C. or below, the change of optical fluid in volume is not sufficiently compensated by only the deformation of the thermally deformable membrane. In this regard, the thermally deformable membrane 150 is provided with initial deformation as shown in FIG. 5 and FIGS. 6A to 6D to sufficiently compensate for the change of optical fluid in volume. Reference numeral L shown in FIG. 8 denotes the size of the second membrane 154 of the thermally deformable membrane 150. In consideration of the function of the second membrane 154 to prevent the deformation of the first membrane 152, the deformation of the lower lens surface of the fluidic lens is in inverse proportion to the size (L) of the second membrane 154.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the inventive concept as defined by the following claims.

What is claimed is:

1. A fluidic lens comprising:
a frame which defines an inner space of the fluidic lens including a driving portion and a lens portion that are connected to each other;
a first membrane attached to one side of the frame to cover at least the lens portion;
a second membrane attached to an opposite side of the frame to cover at least the driving portion and deformable in response to temperature change to vary a volume of the inner space; and
an optical fluid contained in the inner space,
wherein the second membrane comprises a first portion and a second portion, and
the second portion is smaller than the first portion and is disposed underneath the first portion proximate to the lens portion.

2. The fluidic lens of claim 1, wherein the second membrane covers the lens portion and the driving portion, and the fluidic lens further comprises a stiffening frame which is disposed on the first portion of the second membrane corresponds to the lens portion.

3. The fluidic lens of claim 2, wherein the stiffening frame includes a rigid and light passing polymer or transparent glass.

4. The fluidic lens of claim 1, wherein the second membrane is deformable to be bulged outward in response to an increase in temperature and deformable to be bulged inward in response to a decrease in temperature.

5. The fluidic lens of claim 4, wherein the first portion and the second portion of the second membrane comprise two materials, respectively, having thermal expansion coefficients exhibiting a great difference.

6. The fluidic lens of claim 5, wherein the two materials correspond to a metal and a polymer, respectively.

7. The fluidic lens of claim 1, further comprising a supporting frame, having an opening part, disposed on the second membrane to define a deformation range of the second membrane.

8. The fluidic lens of claim 1, further comprising an actuator provided on the first membrane to correspond to the driving portion.

9. The fluidic lens of claim 8, wherein the actuator is a relaxor ferroelectric polymer actuator including P(VDF-TrFE-CFE) or P(VDF-TrFE-CFTE).

10. The fluidic lens of claim of 1, wherein the frame includes silicon, the optical fluid includes silicon oil, and the first membrane includes silicon elastomer.

11. A fluidic lens comprising:
- a first frame which defines an inner space of the fluidic lens including a driving portion and a lens portion that are connected to each other, the lens portion disposed in a center of the first frame and the driving portion surrounds the lens portion;
- an optical fluid contained in the inner space;
- a first membrane attached to one side of the first frame to cover a first opening of the inner space defined by the first frame; and
- a second membrane attached to an opposite side of the first frame to cover a second opening of the inner space defined by the first frame and deformable in response to temperature change to vary a volume of the inner space,
- wherein the second membrane comprises a first portion and a second portion, and
- the second portion is smaller than the first portion and is disposed underneath the first portion proximate to the lens portion.

12. The fluidic lens of claim 11, wherein the second membrane is deformable to be bulged outward in response to an increase in temperature and deformable to be bulged inward in response to a decrease in temperature.

13. The fluidic lens of claim 12, wherein the first portion and the second portion comprise two materials, respectively, having thermal expansion coefficients exhibiting a great difference, and the first portion and the second portion form a symmetric shape around an optical axis.

14. The fluidic lens of claim 13, wherein the two materials correspond to a metal and a polymer, respectively.

15. The fluidic lens of claim 13, wherein the first portion comprises a polymer membrane which includes a polymer and completely covers the second opening of the first frame; and
- the second portion comprises a metal membrane which includes a metal and is disposed on the polymer membrane in a ring shape around the optical axis to correspond to the driving portion.

16. The fluidic lens of claim 15, wherein the metal membrane is disposed to correspond to a portion of the polymer membrane adjacent to the lens portion.

17. The fluidic lens of claim 11, wherein the first portion of the second membrane comprises an edge portion attached to the first frame and a middle portion corresponding to the lens portion and has a slope from the edge portion toward the middle portion, such that the middle portion protrudes beyond the edge portion.

18. The fluidic lens of claim 11, further comprising a second frame disposed on the second membrane corresponding to at least the lens portion.

19. The fluidic lens of claim 18, wherein the second frame is a stiffening frame and includes a rigid and light passing polymer or transparent glass.

20. The fluidic lens of claim 18, wherein the second frame has a shape to expose only a portion of the second membrane corresponding to the driving portion.

21. The fluidic lens of claim 11, further comprising a supporting frame, having an opening part, disposed on the second membrane to define a deformation range of the second membrane.

22. The fluidic lens of claim 11, further comprising an actuator which is provided on the first membrane to correspond to the driving portion and applies a pressure to the optical fluid.

23. The fluidic lens of claim 22, wherein the actuator is a relaxor ferroelectric polymer actuator including P(VDF-TrFE-CFE) or P(VDF-TrFE-CFTE).

24. The fluidic lens of claim 22, further comprising an actuator frame attached to the first membrane, the actuator frame having a shape to expose the actuator and a portion of the first membrane corresponding to the lens portion.

25. The fluidic lens of claim 11, wherein the first frame includes silicon, the optical fluid includes silicon oil, and the first membrane includes silicon elastomer.

26. The fluidic lens of claim 1, wherein the second portion is attached to a part of the first portion, of the second membrane.

27. The fluidic lens of claim 26, wherein another part of the first portion to which the second portion is not attached, is configured to expand or contract to a greater degree than the second portion.

28. The fluidic lens of claim 1, wherein the second portion of the second membrane is disposed to correspond to a portion of the driving portion which surrounds the lens portion.

* * * * *